Patented Sept. 7, 1926.

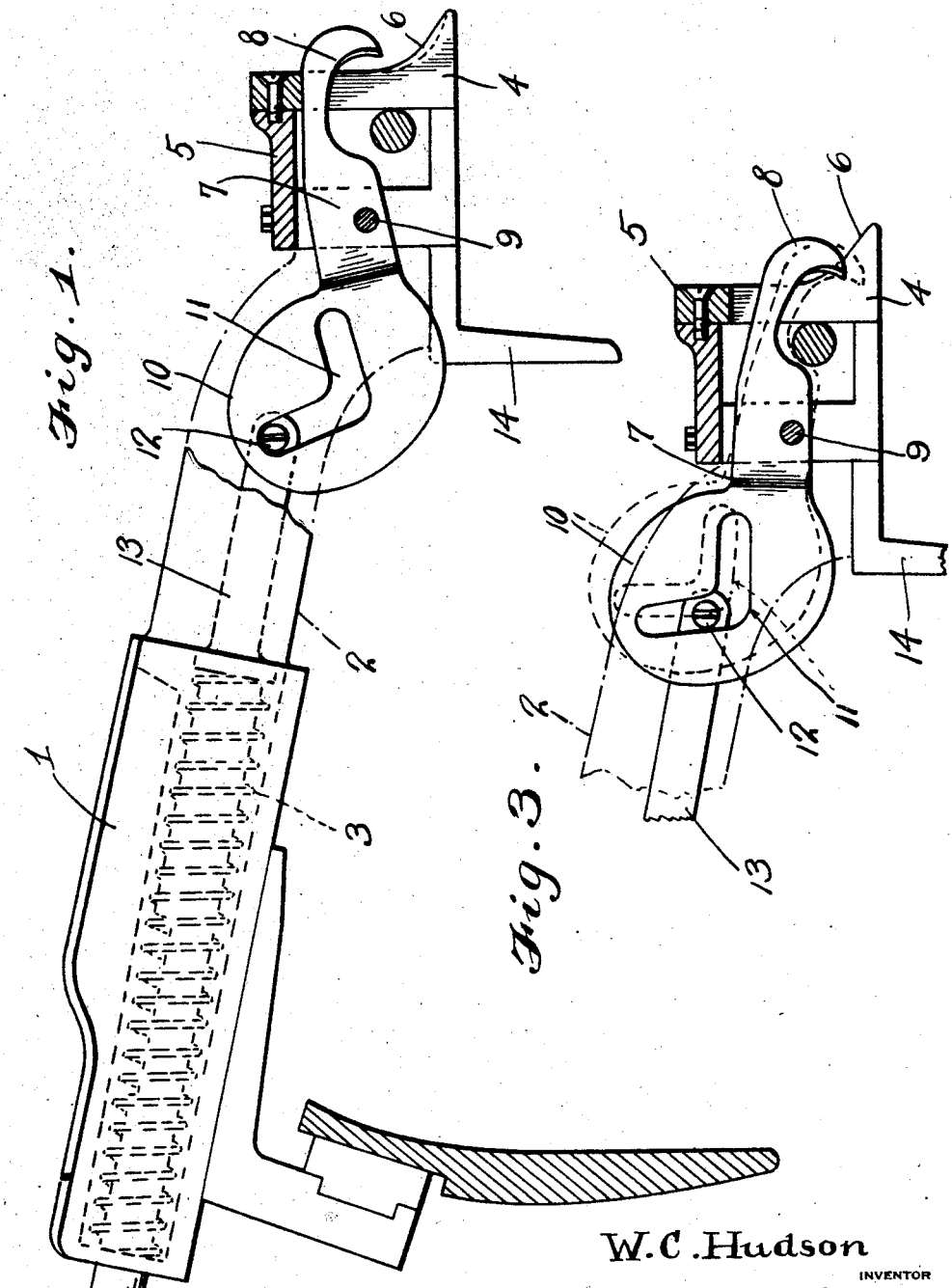

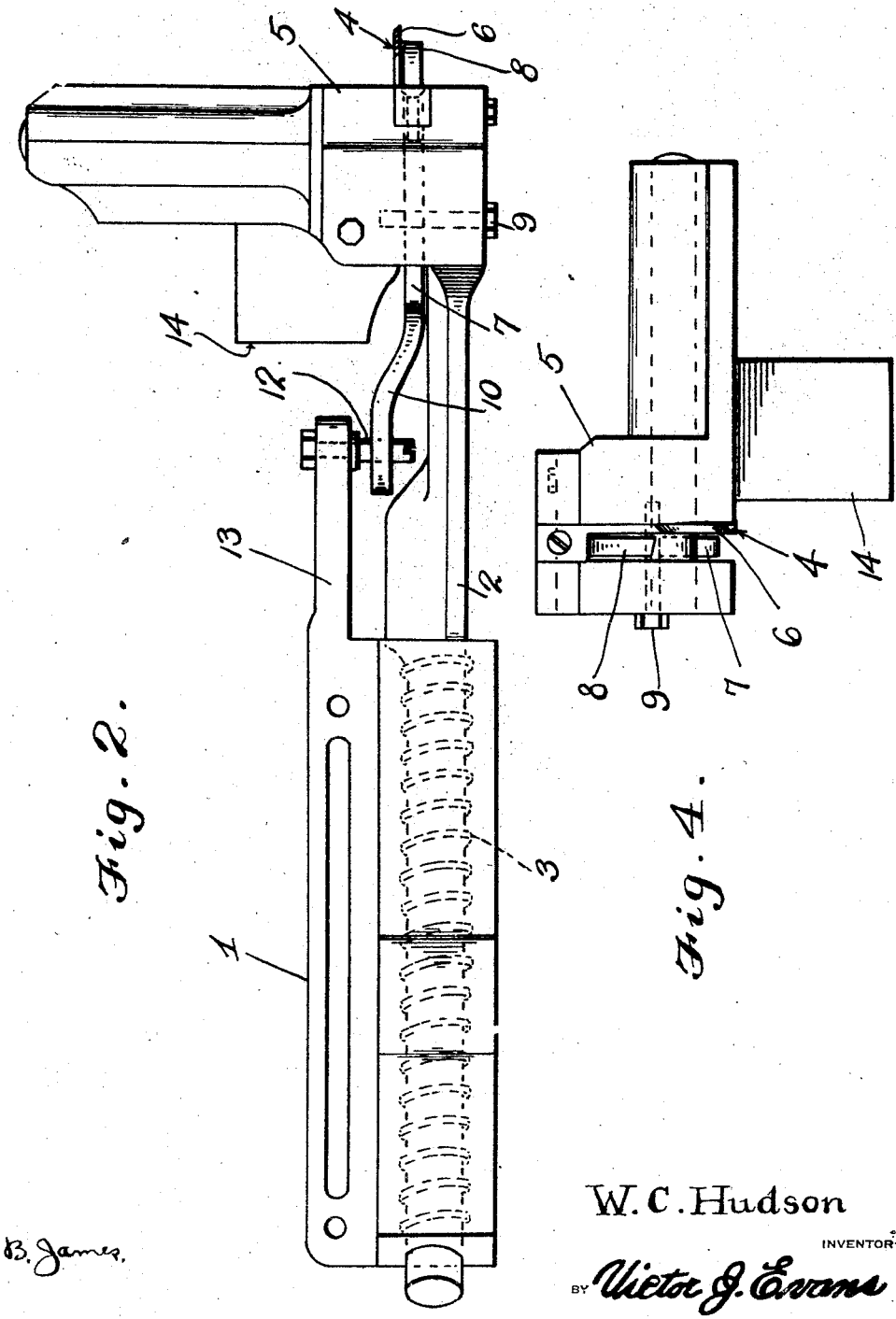

1,599,013

UNITED STATES PATENT OFFICE.

WALTER C. HUDSON, OF ANDERSON, SOUTH CAROLINA, ASSIGNOR TO DRAPER CORPORATION, OF HOPEDALE, MASSACHUSETTS, A CORPORATION OF MAINE.

THREAD-CUTTING DEVICE.

Application filed June 2, 1924. Serial No. 717,406.

This invention relates to a thread cutting device for looms, the object of the invention being to provide a shear cutting action by means of a springless device.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a transverse sectional view of a portion of a loom showing the invention in use.

Figure 2 is a plan view of Figure 1.

Figure 3 is a view showing the parts in a different position from that shown in Figure 1.

Figure 4 is an end view.

In these views, 1 indicates the temple stand of the usual construction and in which the bar 2 is slidably supported and is held in projected position by the spring 3. The stationary cutting blade 4 on the temple head 5 has its beveled cutting edge in the shape of a concave curve facing upwardly and rearwardly, as shown at 6, and the movable cutter 7 has its rearward arm provided with a hook-shaped cutting edge, as shown at 8. This cutter 7 is a unitary lever pivoted or fulcrumed in the head by the pin 9 which is arranged substantially midway the ends of the cutter so that the cutter can be rocked and its forward arm is enlarged, as at 10, and provided with an angle-shaped or cam slot 11 which is engaged by a pin 12 on an arm 13 of the stand 1.

The parts are so arranged that when the lay strikes the depending part 14 of the head the head will be moved forwardly or to the left in Figures 1 and 2 and as the pin 12 remains stationary its engagement with the slot 11 will rock the cutter 7 about the pin 9 so that its hook-shaped cutting part will move downwardly over the concave edge of the cutter blade 4 so as to cut the threads with the shearing cut. As will be seen the point of cutter 7 will make contact with and pass the edge of the cutter blade 4 before the actual cutting of the thread takes place so that the threads are caught and held by the cutters and finally cut. The peculiar shape of the cutter blade 4 also tends to prevent the loose ends of the threads from falling out of reach of the movable cutter. Both cutters are of extra strong construction and because of the ease of operation, due to the arrangement of the parts, the wear is reduced to a minimum and the life of the movable cutter is greatly prolonged. In my device the mechanism is operated indirectly by the lay of the loom and not directly as so many of the present looms are operated. My arrangement also eliminates the use of the spring.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In a loom, a stationary cutter having a concave cutting edge, a movable cutter having a hook-shaped cutting edge, the point of which engages the cutting edge of the stationary knife before the actual cutting operation takes place, means for actuating the movable cutter, such means consisting of an enlargement having a cam slot therein on the movable cutter and a projection on the stationary part of the loom for engaging the slot.

2. In a loom, a temple stand, a spring pressed bar slidably mounted therein, a head on said bar, and a unitary cutter lever fulcrumed in the head with its rearward arm presenting a hook-shaped cutting edge and its forward arm having a pin and cam slot connection with the temple stand to effect the opening and closing movements of the cutter lever positively from the relative sliding movements of the temple head and stand.

3. In a loom, a thread cutting temple comprising a stationary cutter blade having an upwardly and rearwardly facing concave cutting edge against which the filling ends are carried during the weaving operation, a movable cutter member presenting a hook-shaped cutting edge, facing the edge of the stationary blade, and means for actuating the movable cutter member to cause the point thereof to pass the concave edge of the stationary blade and thus enclose the filling end between the cutting edges prior to the actual cutting operation.

In testimony whereof I affix my signature.

WALTER C. HUDSON.